Jan. 7, 1964   S. H. SIME   3,116,716
ANIMAL FEED CONVEYING, BLENDING AND DISTRIBUTING APPARATUS
Filed Jan. 12, 1962   2 Sheets-Sheet 1

INVENTOR
SYLVAN H. SIME
BY Williamson & Palmatier
ATTORNEYS

Jan. 7, 1964 S. H. SIME 3,116,716
ANIMAL FEED CONVEYING, BLENDING AND DISTRIBUTING APPARATUS
Filed Jan. 12, 1962 2 Sheets-Sheet 2
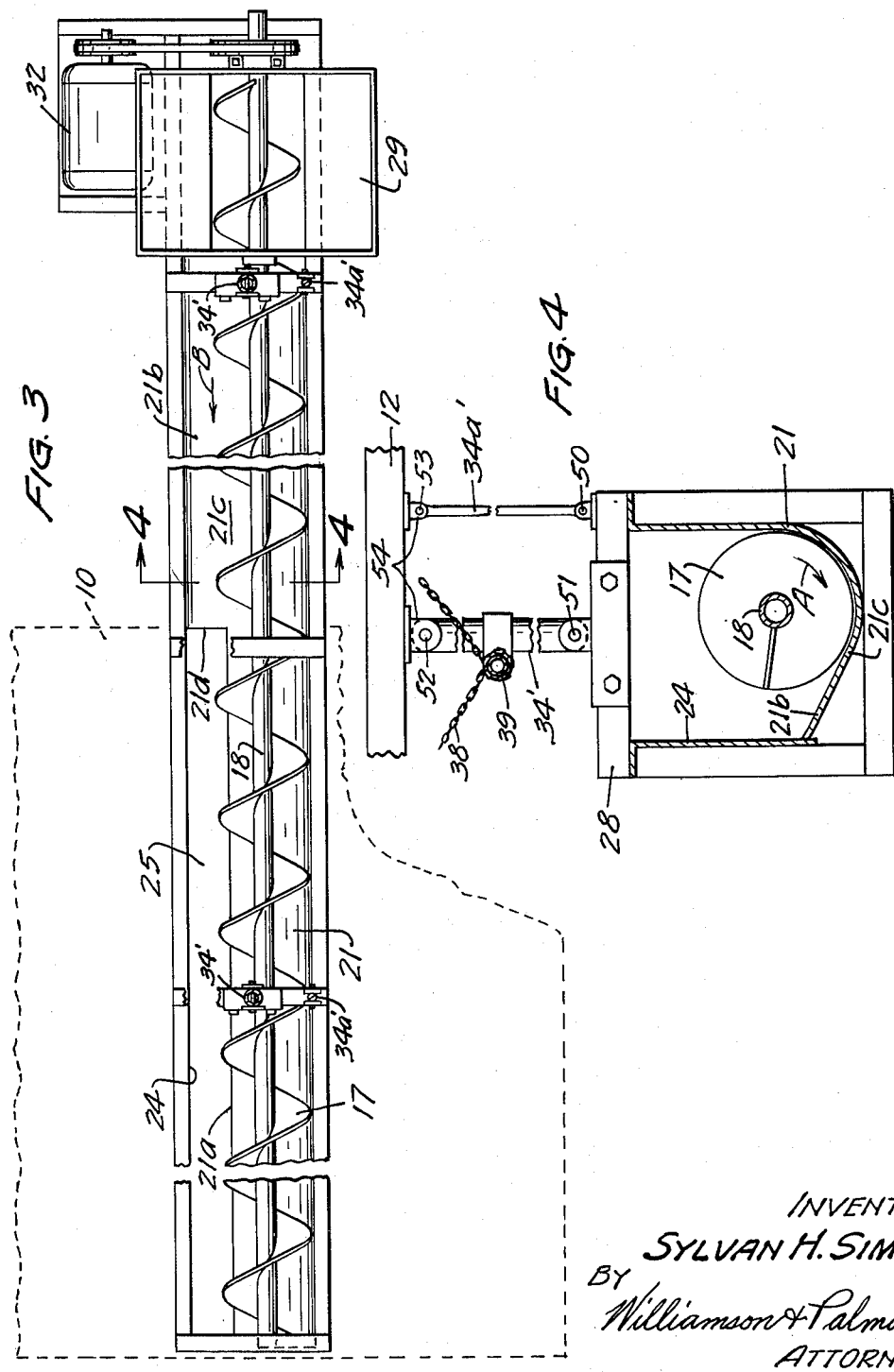
INVENTOR
SYLVAN H. SIME
BY
Williamson & Palmatier
ATTORNEYS United States Patent Office 3,116,716
Patented Jan. 7, 1964

3,116,716
ANIMAL FEED CONVEYING, BLENDING AND
DISTRIBUTING APPARATUS
Sylvan H. Sime, Kiester, Minn.
Filed Jan. 12, 1962, Ser. No. 165,867
8 Claims. (Cl. 119—52)

This application is a continuation-in-part of applica- and more particularly relates to a bunk filler and feed mixing apparatus.

This application is a continuation-in-part of application Serial Number 50,640, filed August 19, 1960.

Bunk fillers have been used extensively in the past, but these have had several disadvantageous aspects. It is frequently difficult to place enough feed in the bunk, per foot of length, to feed the desired number of cattle and further, if the bunk is made large enough to carry a large windrow of feed, the cattle cannot easily reach the feed after the first portions are gone. It frequently happens that wind will blow valuable portions of the feed out of the bunk, while the bunk is being filled. It has also been found with many bunk fillers that the various components of the feed mixture will separate and the cattle will quickly eat the more tasty feed and will leave the rest. In this regard it has been found in many instances the reason for separation is the different consistency of feed being mixed and fed. Some of the consistencies are fine meal, kernels or pellets, fibrous material such as stems of grass or alfalfa, poorly cut material such as shredded corn husk, large pieces of corn cob and stickly feeds such as certain stages of grass silage. Mixtures of these types of feed tend to separate when the mixture drops a distance and falls on top of the resulting conical pile of feed.

With these comments in mind, it is to the elimination of these and other disadvantages that the present invention is directed along with the inclusion therein of other novel and desirable features.

An object of my invention is to provide a new and improved bunk feeding apparatus of simple and inexpensive construction and operation.

Another object of my invention is the provision of a novel bunk filling apparatus which is well adapted for supplying feed mixtures in well mixed condition in ample quantities for feeding livestock so that feed is readily accessible to the livestock.

A further object of my invention is to provide a novel and improved feed augering device for supplying various types of feed to bunks and the like with a minimum of power and without causing separation of the various types of feed.

These and other objects and advantages of my invention will more fully appear from the following description made in connection with the accompanying drawings wherein like reference characters refer to the same or similar parts throughout the several views and in which:

FIG. 3 is a top plan view of a slightly modified form of the invention with certain portions being broken away and shown in section;

FIG. 4 is an enlarged detail section view, partly broken away and taken on a plane as indicated at 4—4 in FIG. 3;

Figure 1:
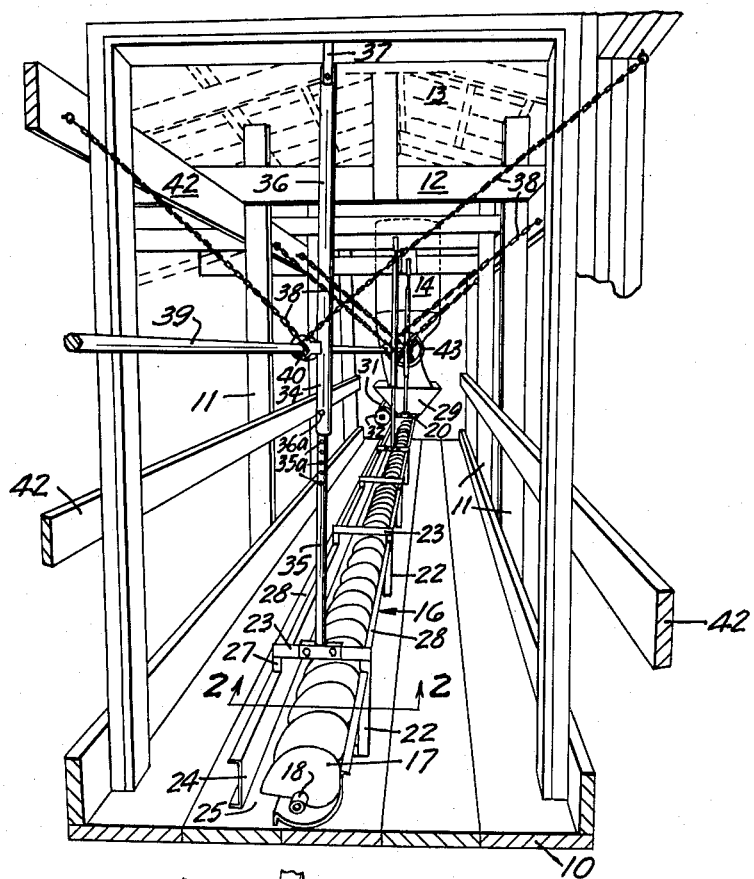
FIG. 1 is a perspective view of the invention.
Figure 2:
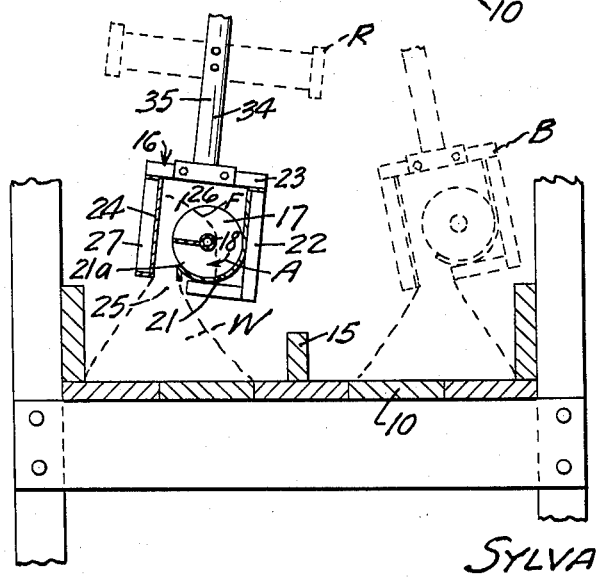
FIG. 2 is a detail section view taken approximately at 2—2 in FIG. 1, with parts in cross section.

One form of the invention is shown in FIGS. 1 and 2 and is described herein.

A feed bunk 10 is supported on suitable posts 11, the upper ends of which are interconnected by cross bars or joists 12 which may, if desired, provide the supporting structure for a roof 13 which is shown in dotted lines. One end of the bunk 10 is disposed beneath the unload- ing tube 14 of a silo, or other convenient supply of feed. The bunk 10 also has an upright wall 15 midway between the opposite sides to divide the bunk into a pair of longitudinally extending side-by-side compartments. In this arrangement livestock may feed from both sides of the bunk. Furthermore, as will hereinafter be more fully pointed out, the rations deposited in each side of the bunk may be different, if different types or grades of livestock are being fed.

The feed is conveyed to and distributed along the bunk 10 from the supply tube 14 by an auger conveyor which is indicated in general by numeral 16. The auger conveyor includes the conventional helicoid 17 having a center shaft 18. One end of shaft 18 is carried in a thrust bearing which is carried by the end frame 20. The helicoid 17 is supported on its peripheral edge by an elongate, arcuately curved cradling plate 21 which extends downwardly around one side of the helicoid and through a vertical plane which includes the rotation axis and to an edge 21a thereof which is spaced from said vertical plane. The curvature of the plate 21 is substantially identical to the curvature of the periphery of the helicoid 17 so that the helicoid is supported over a substantial surface area. The plate 21 extends throughout the entire length of the helicoid 17 and is supported by a plurality of substantially L-shaped members 22, the lower portions of which underlie the plate 21 and upper portions of which lie against the side of plate 21. It will be noted that none of the frame members 22 project horizontally beyond the edge 21a of the plate. The plate 21 is affixed to the frame members 22 as by welding and the frame members 22 are affixed at their upper ends to cross bars 23 which extend transversely across the helicoid 17 in spaced relation thereabove.

An elongate and substantially planar feed-confining plate 24 is positioned in spaced and confronting relation with the other side of helicoid 17 and with the edge 21a so as to define an elongate and continuous, unbroken feed-discharging slot 25 adjacent the edge 21a and also to define an elongate and continuous unbroken feed-conveying area 26 adjacent the helicoid. The plate 24 is supported by a plurality of upright frame elements 27 which are welded to the outer side of the plate 24 and which are affixed as by welding at their upper ends to the cross bar 23. It will be noted that longitudinally extending angle bars 28 extending along the outer sides of the plates 21 and 24 are affixed as by welding to the frame parts 22 and 27 for rigidifying the structure and tying the structure solidly together.

A hopper 29 is provided at the supply end of the auger conveyor and is supported on the elongate frame members 28 so as to direct feed from the chute 14 into the helicoid. A motor 32 is affixed by brackets to one of the elongate frame members 28 and is connected by pulley and belt drive 31 to the auger shaft 18 which extends through the hopper 29. The desired speed at auger 17 is provided by the speed-reducing action of the large and small pulleys and sprockets. It should be understood that the shaft might be employed to drive a concentrate metering device if it is desired to add concentrate to the feed.

It will be noted that the plate 21 is continuous all along the length of the helicoid 17 and shaft 18 and also defines the bottom of the hopper 29, into which the helicoid 17 extends on the shaft 18. It is particularly important and critical to the invention that the plate 21 has no exposed end edges which face generally toward the hopper 29. Preferably the plate 21 is continuous all along its length. However, in the event it is desired to add extra sections of the conveyor 16 to an existing installation, a new section of plate 21 might be joined with the existing plate 21 such that the new section is lapped with the old section in underlying relation, thereby preventing any endwise facing edges from being exposed in a direction facing the hopper 29 or the supply end of the auger conveyor. In such a lapped relation, the plate 21, upon which the helicoid 17 is supported might have an end edge facing endwise away from the hopper 29, or in the direction of travel of the feed along the conveyor so as to prevent any obstructing of the feed as it moves along the conveyor.

The entire helicoid and supporting framework therefore, including plates 21 and 24 and the frame members and cross pieces 23 are suspended on elongate upright telescoping rods 34, the lower sections 35 of which are bolted to certain of the cross members 23, and the upper sections 36 of which are swingably supported on brackets 37 to permit swinging of the auger conveyor in a side-to-side direction above the bunk 10. The brackets 37 are bolted to the joists or cross members 12. It will be seen that the upper and lower telescoping sections 36 and 35 may be adjusted with respect to each other in order to properly adjust the elevation of the auger conveyor above the bunk 10, and to this end, the lower section 35 has a plurality of apertures 35a therein and the upper section also has apertures receiving bolts 36a which also extend through certain of the apertures 35a in the lower sections.

Means are provided for moving the auger conveyor in a side-to-side direction above the bunk 10 and in the form shown such means includes a plurality of elongate flexible elements or chains 38 spaced from each other along the length of the auger conveyor. Each of the chains 38 is wrapped several times around an elongate shaft 39 which extends throughout the entire length of the auger conveyor and which is carried in suitable bearings 40 on the upper sections 36 of the telescoping support rods 34. The chains 38 are maintained in a substantially taut condition and the opposite ends of each of the chains extend in opposite directions toward the sides of the bunk. The ends of chains 38 are suitably anchored at opposite sides of the bunk and in the form shown the chains 38 are anchored on longitudinal frame elements 42 which are affixed to the upright post 11 and serve to tie the supporting structure together.

The shaft 39 is provided with a large hand wheel 43 at one end for rotating the shaft, and a double-acting ratchet and pawl mechanism which serves to prevent rotation of the shaft 39 in either direction, but is releasable to permit the desired rotation of the shaft.

In the operation of the invention, feed is supplied from the chute 14 into the hopper 29 and into the auger conveyor. The motor 32 is operated in order to revolve the helicoid and it should be particularly noted that the helicoid 17 is rotated in the direction of arrow A so that the helicoid, in its underpassing arc of rotation moves outwardly toward and over the edge 21a of plate 21. This direction of rotation of the helicoid 17 causes the helicoid to stay in engagement with the upright portion of the cradling plate 21 and because of the large wearing surface, due to the substantially identical curvature of the helicoid periphery of the plate 21, the helicoid runs smoothly on the plate. As the helicoid 17 is revolved in the direction of arrow A, the feed supplied from the hopper 29 will drop through the feed-discharging slot 25 and will form an elongate mound or windrow W of feed in the bunk 10. When a windrow W has been formed under one end of the auger conveyor, the feed being carried and supplied by the helicoid will longitudinally move through the area 26 and the feed being moved will stay mostly to one side of the helicoid, substantially within the area indicated by the dotted lines F in FIG. 2. Only small amounts of feed will be disposed in the helicoid at the opposite side thereof and these small portions are immediately moved over into the area 26. There will be sufficient feed on the plate 21 so as to adequately lubricate the helicoid as it revolves.

It should be pointed out that as the feed moves along the area 26 and is deposited on the bunk at the outer end of the window, there is substantially no separation of the various types of feed which may be intermixed. All portions of the feed, whether light or heavy, granular or stringy, are well mixed when deposited upon the bunk. It should be further noted that because the slot between plate 24 and edge 21a is open and unobstructed throughout its entire length, and because the area 25 is unobstructed throughout its entire length, there is no tendency whatever for the stringy types of feed such as chopped grass to collect or otherwise obstruct the movement of other feed. It will therefore be seen that the auger conveyor is light running and substantially all of the power used is applied for actual moving of the feed being carried along the length of the helicoid. The auger and shaft is mounted free of actual bearings except for thrust bearing 19 and as a result there is no obstruction or other apparatus to clog against free flow of the feed resulting in free and easy running and no freezing in cold weather.

When a windrow W of feed is formed along the entire length of the helicoid, the open bottomed trough defined by plates 21 and 24 may be easily emptied by merely rotating the hand wheel 43 so as to swing the helicoid sideways over the bunk. If the supply from the chute is cut off, and the auger is let run for a few moments after the auger has been moved to one side, all of the feed in the area 26, in the slot 21, and the feed confined by the helicoid will drop down from the slot 25 so as to completely empty the helicoid and the trough. It will be seen that by completely removing all of the feed in this fashion there will be and is no problem of freezing of feed during cold weather. As a result, the instant invention is well adapted for outdoor use. Of course the roof 13 is desirable to protect the mechanisms and the cattle while eating.

It should also be noted that supplying of the feed may be carried on while the cattle are actually eating because the sides of the helicoid are completely confined and there is no possibility of cattle getting their tongues in the auger or otherwise getting hurt. It should further be noted that because the auger may be quickly and easily emptied as hereinbefore described, the motor 22 need not have any special high starting torque characteristics because when the motor is first started only the helicoid is to be turned.

By first forming a windrow in approximately the position shown in FIG. 2, cattle at the corresponding side of the bunk can easily reach the feed without requiring a person to get in the bunk and shovel the feed back over to the cattle. After the windrow has been formed the auger conveyor can be moved into the other side of the bunk as shown in the dotted line B in FIG. 2 so as to produce another windrow on that side of the bunk. It should be noted here that the bunk 10 may divide a feed lot such that one type or grade of livestock is kept at one side of the bunk and another grade or type of livestock is kept at the other side of the bunk. The formulae of feed supplied at opposite sides of the bunk may be different for these different types of grade of livestock.

It is to be noted that the helicoid 17 may be adjusted close to the bunk 10 so that the windrows W are of low height to prevent the wind from blowing the feed away. Even though the windrow W is of low height, additional feed may be applied in the same side of the bunk by merely moving the auger conveyor sideways slightly so as to effectively form another windrow in the same side of the bunk.

Ordinarily, after the bunk has been filled, the auger conveyor will be positioned approximately at the center of the bunk to be out of the way as cattle are feeding. It may be desirable to clamp wood rails R, shown in dotted lines, to the bottom section of the telescoping rod 34 so as to extend along the side of the bunk, above the bunk wall, when the auger is disposed substantially in the center of the bunk so as to prevent the cattle from climbing in the bunk.

In the form of the invention shown in FIGS. 3 and 4, substantially all of the structure is identical to the apparatus described in connection with FIGS. 1 and 2, except as noted.

The helicoid 17 and shaft 18 are rotated by the motor 32 for carrying feed from the hopper 29 along the auger conveyor and allowing the feed to be deposited downwardly through the continuously open and unobstructed space 25 between the edge 21a of the helicoid-cradling plate 21 and the upright feed-retaining plate 24.

In this form of the invention, it is contemplated that there may be some considerable distance between the feed bunk 10 which is indicated in general by numeral 10 and shown in dotted lines, and the supply hopper 29 which as indicated will be located beneath the chute 14 as seen in FIG. 1 of a silo. In order to transport the feed supplied from the hopper 29 to the point of distribution or the feed bunk 10, the plate 21, along a portion of its length, has a transversely extending portion 21b extending diagonally outwardly and slightly upwardly from the point of tangency with the outer periphery of the helicoid 17. It will be seen that the helicoid-cradling plate 21 extends downwardly and around the periphery of the helicoid 17 and follows the peripheral configuration of the helicoid 17 to a location indicated approximately at 21c in FIG. 4 which is spaced from a vertical plane through the rotation axis of shaft 18 and helicoid 17, and in the general direction of rotation as indicated by the letter A in FIG. 4. The point of tangency 21c from which the plate portion 21b diverges from the periphery of the helicoid 17 is also in longitudinal alignment with the edge 21a which defines one side of the discharge slot 25.

It is to be noted that the plate 21, along the length of the portion 21b thereof, defines no endwise facing edges which face generally opposite to the direction of travel, indicated by the letter B, of the feed as it progressively moves along with the helicoid. The end edge 21d of the portion 21b faces away from the hopper 29 and in the general direction of arrow B so that there is no interference by the portion 21b of plate 21 with the travel of the feed or grain along the helicoid. As the feed is supplied from the hopper 29 into the helicoid, the feed is carried along by the helicoid substantially in the manner as indicated by the letter F in FIG. 2 and the feed is supported on the plate portion 21b until the feed reaches the edge 21d, whereupon the feed will be discharged downwardly through the continuously open and unobstructed space 25 into the bunk 10. The apparatus, along the length of plate portion 21b, defines a feed conveyor, and the apparatus, spaced in the direction of arrow B from the end edge 21d defines a feed conveyor and distributing mechanism.

It will be understood that because the feed is conveyed along the portion 21b in the manner indicated by the letter F in FIG. 2, that is mostly off to one side of the helicoid 17, the feed will be carried along by the helicoid and without causing any wrapping or collection of stringy type feeds such as silage, at any point along the lenght of the helicoid adjacent the plate portion 21b. Of course it will be understood that the plate portion 21b could be extended to various lengths and the conveying mechanism defined along the length of plate portion 21b might be utilized for general conveying purposes without regard to supplying the feed to the slot portion 25 for distribution thereof.

In the form of the invention shown in FIGS. 3 and 4, the framework 28 and the helicoid 17 and the plate 21 are all supported by a pair of telescoping support rods 34' and 34a' which are disposed in spaced and parallel relation with each other and which have the opposite upper and lower ends thereof swingably connected by pivots 50 and 51 to the frame 28 and by pivots 52 and 53 to the support ears 54 which are attached rigidly to the framework 12. It will therefore be seen that when the shaft 39 is revolved as described hereinbefore, the support rods 34' and 34a' will be swung to one side or the other so as to move the feed-conveying and distributing apparatus including helicoid 17 toward one side of the bunk or toward the other side of the bunk. Because of the parallel and swinging relationship of the telescoping support rods 34' and 34a', the orientation of the helicoid-cradling plate 21 is constant in relation to the horizontal or vertical plane so as to maintain the helicoid and the feed carried along the plate 24 in constant relation with each other and thereby prevent any changing of the travel characteristics of the feed as it moves along the helicoid.

It will, of course, be understood that various changes may be made in the form, detail, arrangement and proportion of the parts without departing from the scope of my invention which consists of the matter described herein and set forth in the appended claims.

What I claim is:

1. An animal feeding apparatus for distributing feed in a row along a bunk, comprising an augering helicoid, a helicoid supporting panel extending along the helicoid and having an arcuate lower portion extending downwardly along one side of and along the bottom of the helicoid and through a vertical plane including the rotational axis of the helicoid and to an edge spaced from said plane and positioned below the helicoid, means supporting said panel above said bunk, means revolving said helicoid to move the helicoid in its underpassing arc of rotation outwardly over said edge, an upright feed retaining plate extending along the other side of the helicoid having an inner upright feed engaging surface in confronting and spaced relation with said edge and with the helicoid, said plate and edge defining an elongate, downwardly facing, continuous and unbroken discharge opening between the upright plate and said edge along the length of the helicoid to facilitate ready and easy discharge of all types of feed in blended or mixed condition, and means mounting said plate in fixed relation with said helicoid and panel.

2. Apparatus as defined in claim 1, wherein said plate is flat and extends substantially vertically.

3. Apparatus as defined in claim 1, wherein said helicoid is rotatably supported and guided directly upon an upper surface of said arcuate lower portion of said helicoid supporting panel.

4. Apparatus as defined in claim 1, wherein said means mounting said plate comprises a rigid frame extending transversely above said helicoid and secured to said plate and panel.

5. Apparatus as defined in claim 1, wherein said helicoid supporting panel has a radius of curvature at the lower arcuate portion thereof substantially equal to the curvature of the outer edge of the helicoid.

6. Apparatus as defined in claim 1 including a hopper connected to one end of said panel above said helicoid, said arcuate lower portion including an extension secured thereto at said one end, said extension extending to said plate so as to close one end portion of said opening.

7. Apparatus as defined in claim 1 including a lip secured to said edge and depending downwardly therefrom, said lip being generally parallel to said panel.

8. Apparatus as defined in claim 7, wherein said panel is spaced a substantial distance from said lip and said helicoid whereby a mixture of fibrous material and fine feed may readily pass between said lip and panel.

References Cited in the file of this patent

UNITED STATES PATENTS

| | | |
|---|---|---|
| 1,027,432 | Prinz | May 28, 1912 |
| 2,827,156 | Linder | Mar. 18, 1958 |
| 2,970,568 | Johnson | Feb. 7, 1961 |